United States Patent [19]

Colasanti et al.

[11] Patent Number: 5,076,643
[45] Date of Patent: Dec. 31, 1991

[54] LUMBAR SUPPORT

[75] Inventors: Arduino Colasanti, East Detroit; Paul J. Zimmer, Livonia, both of Mich.

[73] Assignee: Lear Seating Corporation, Southfield, Mich.

[21] Appl. No.: 569,556

[22] Filed: Aug. 20, 1990

[51] Int. Cl.$^5$ .............................................. A47C 3/00
[52] U.S. Cl. ............................ 297/284 E; 297/284 C; 297/DIG. 3
[58] Field of Search .................. 297/284, DIG. 3, 460

[56] References Cited

U.S. PATENT DOCUMENTS

| | | | |
|---|---|---|---|
| 3,326,601 | 6/1967 | Vanderbilt et al. | 297/284 |
| 4,159,847 | 7/1979 | Arai | 297/284 |
| 4,516,568 | 5/1985 | Baxter et al. | 128/70 |
| 4,518,200 | 5/1985 | Armstrong | 297/284 |
| 4,601,514 | 7/1986 | Meiller | 297/284 |
| 4,627,661 | 12/1986 | Rönnhult et al. | 297/284 |
| 4,632,454 | 12/1986 | Naert | 297/460 X |
| 4,790,496 | 12/1988 | Marrujo | 297/460 X |
| 4,807,931 | 2/1989 | Ishida et al. | 297/284 |
| 4,909,568 | 3/1990 | Dal Monte | 297/460 X |

FOREIGN PATENT DOCUMENTS 1299789  12/1972  United Kingdom .

Primary Examiner—Kenneth J. Dorner
Assistant Examiner—J. Bonifanti
Attorney, Agent, or Firm—Reising, Ethington, Barnard, Perry & Milton

[57] ABSTRACT

A lumbar support assembly for a seat having a seat frame and a backrest. The assembly (10) includes a rigid mounting member (18) within the seat frame (14) supported by a plurality of springs (28) or alternatively by integral clips (58). A pneumatic bladder (32) is supported on the mounting member (18) by a plurality of fasteners (61). A contoured plate (42) is disposed adjacent the mounting member (18) and the bladder (32) is supported between the contoured plate (42) and the mounting member (18), as the bowed contoured plate (42) urges the bladder (32) toward the inflated position. A plurality of guides (30) are disposed upon the mounting member (18) and are adapted to slideably receive a plurality of fingers (56) integrally disposed on the contoured plate (42). A pneumatic tube (34) extends from the bladder (32) to a normally closed pneumatic control valve (36) which is attached to any remote location. Upon opening of the valve (36) the inflated bladder (32) adjusts toward a deflated state as air is released in response to force being applied to the backrest (16) allowing for incremental adjustments in contour.

20 Claims, 5 Drawing Sheets

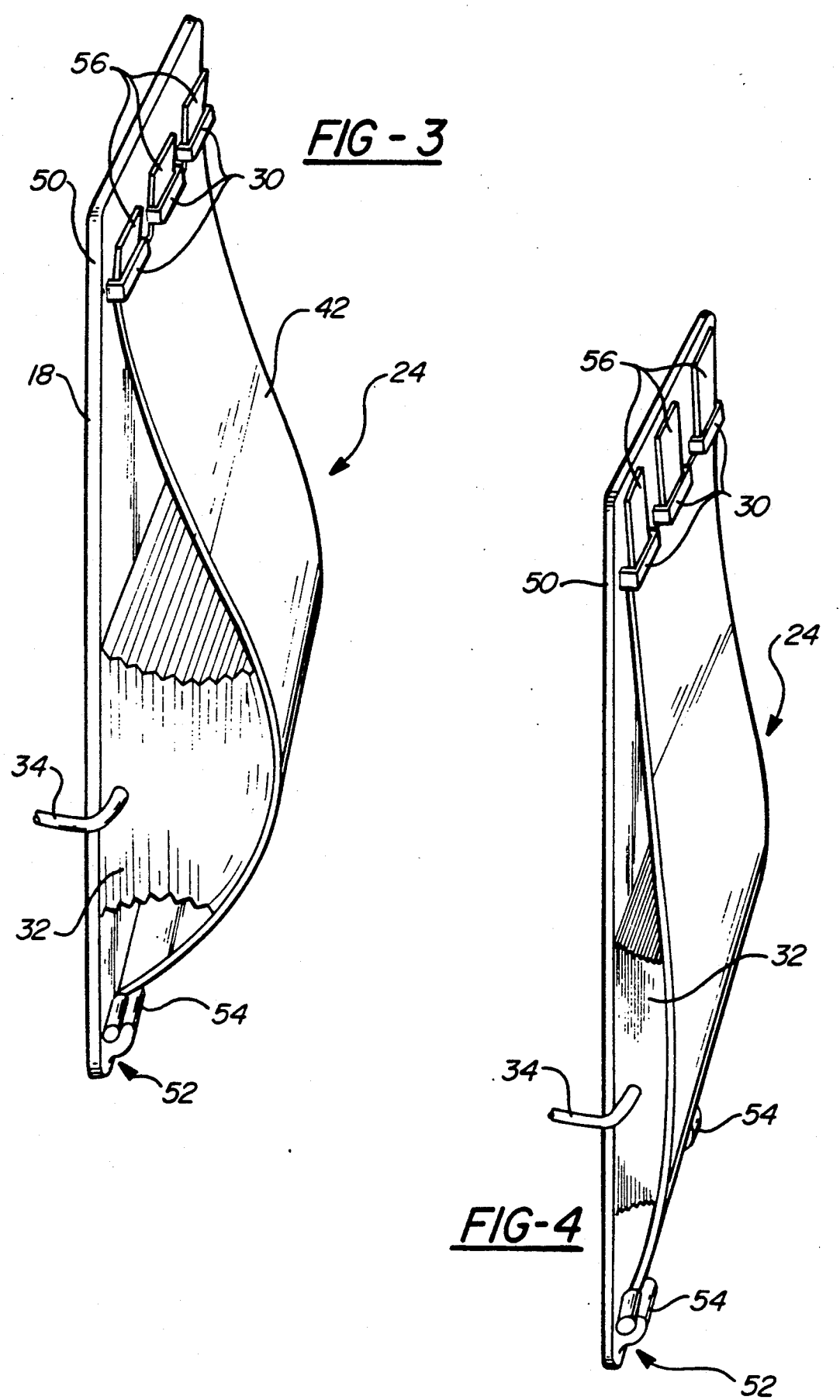

LUMBAR SUPPORT

TECHNICAL FIELD

The subject invention relates to an adjustable support assembly for use in the backrest of a seat, and, more particularly, to a pneumatically adjustable lumbar support allowing the passenger of a motor vehicle to adjust the seat back cushion to desired contour.

BACKGROUND ART

Conventionally, lumbar support assemblies are used for maintaining a seat cushion in a contoured position. Such lumbar support assemblies usually include either bellows, air bladder or a pump to force air into the cushion pocket to reach a desired contour.

British Patent Number 1,299,789 discloses an adjustable self inflated support cushion with an air impermeable exterior shell which surrounds an open self foamed material. Further, U.S. Pat. No. 4,516,568 to Baxter et al discloses yet another pressure exerting device comprising a resilient wedged shape member and modified U-shaped air bladder which may be filled to selected air pressures. However, these systems of lumbar adjustment are inadequate as they are sensitive to temperature change thus rendering adjustment hard to achieve. Moreover, foam tends disintegrate with wear over time, thus, decreasing contour effect. And none have a normal state with the bladder in the inflated state without air pressure being applied.

SUMMARY OF THE INVENTION AND ADVANTAGES

The subject invention is an assembly including a seat having a seat frame and backrest. The assembly comprises a mounting member for mounting to a seat frame and a pneumatic adjustment means supported on the mounting member for moving between inflated and deflated states. The assembly also includes control means for controlling movement of the pneumatic adjustment means between the inflated and deflated states with the control means characterized by including back support means independently supported on the mounting member and extending over the pneumatic adjustment means for biasing the pneumatic adjustment means toward the inflated state and moving inwardly toward a deflated state in response to a passenger to an infinitely adjustable contour.

Accordingly, the present invention provides durable back support means having a flexible contoured plate with a free state contour which maintains the pneumatic adjustment means in an inflated state forming the backrest while forming the backrest in a maximum outwardly contoured position. Hence, inflation of the pneumatic adjustment means will not be dependent on temperature. Likewise, foam is not required in order for inflation of the pneumatic adjustment means to occur since the back support means necessarily will try to maintain its inflated free state position. Additionally, the contoured plate provides for sturdy back support means, thus allowing manufacturers to vary the thickness of the seat cushion as desired to provide for a more comfortable seat.

FIGURES IN THE DRAWINGS

Other advantages of the present invention will be readily appreciated as the same becomes better understood by reference to the following detailed description when considered in connection with the accompanying drawings wherein:

FIG. 1 a perspective view partially broken away and in cross section of the preferred embodiment of the subject invention within the seat frame;

FIG. 3 is a perspective view of the pneumatic adjustment means in an inflated state;

FIG. 4 is a perspective view of the pneumatic adjustment means in the deflated state;

DESCRIPTION OF THE PREFERRED EMBODIMENT OF FIGS. 1-6

Figure 1:
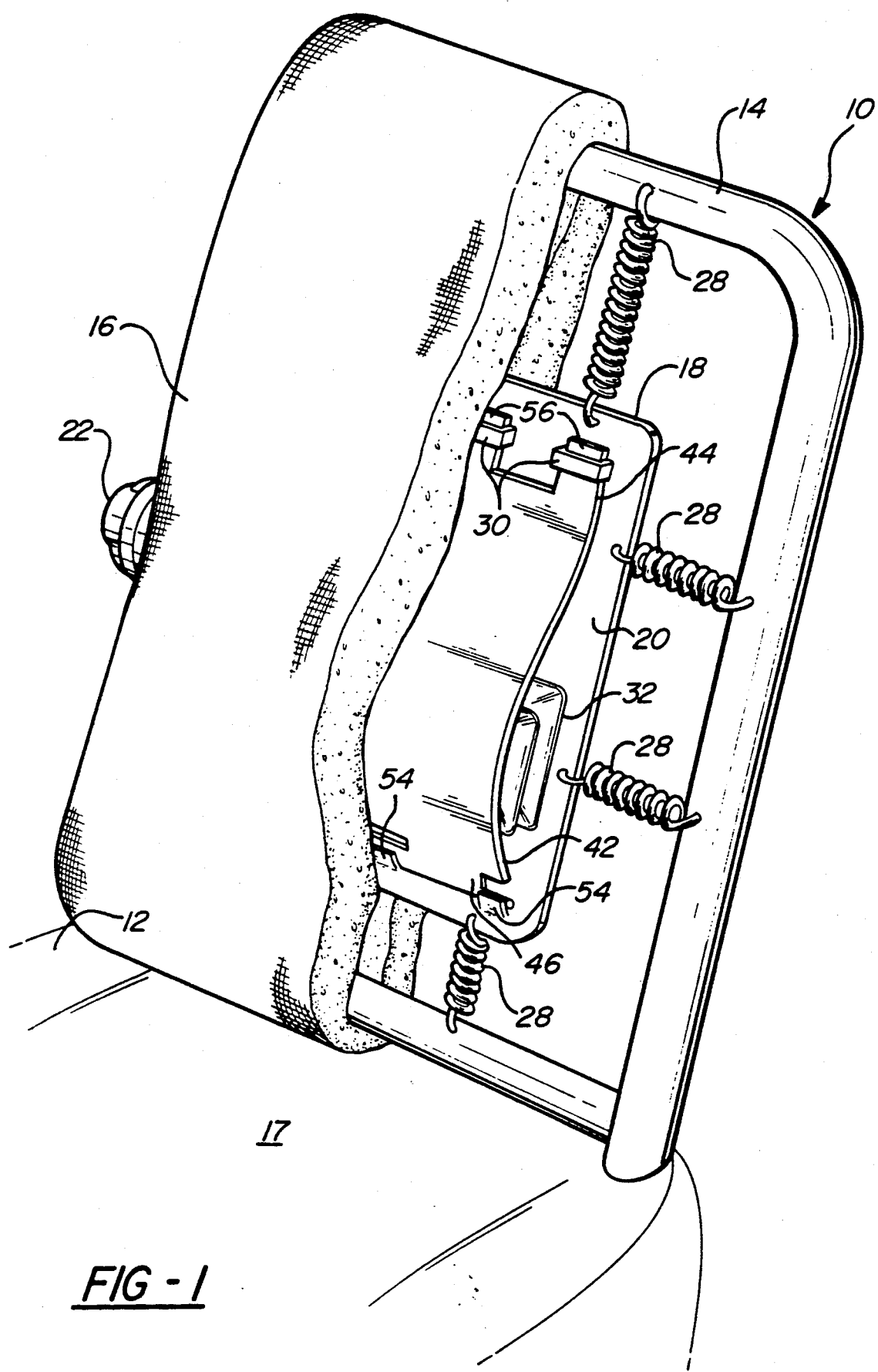

Referring to the Figures wherein like numerals indicate like or corresponding parts throughout the several views, a lumbar support assembly 10 is shown in FIG. 1 for a seat 12 including a seat frame 14 on a backrest 16 including a seat cushion 17. The assembly 10 shown in FIG. 2 includes a mounting member 18 for mounting to the seat frame 14. A pneumatic adjustment means 20 is supported on the mounting member 18 and includes a control means 22 for controlling movement of the pneumatic adjustment means 20 between inflated and deflated states. A back support means 24 is supported on the mounting member 18 which extends over and biases the pneumatic adjustment means 20.

Figure 2:
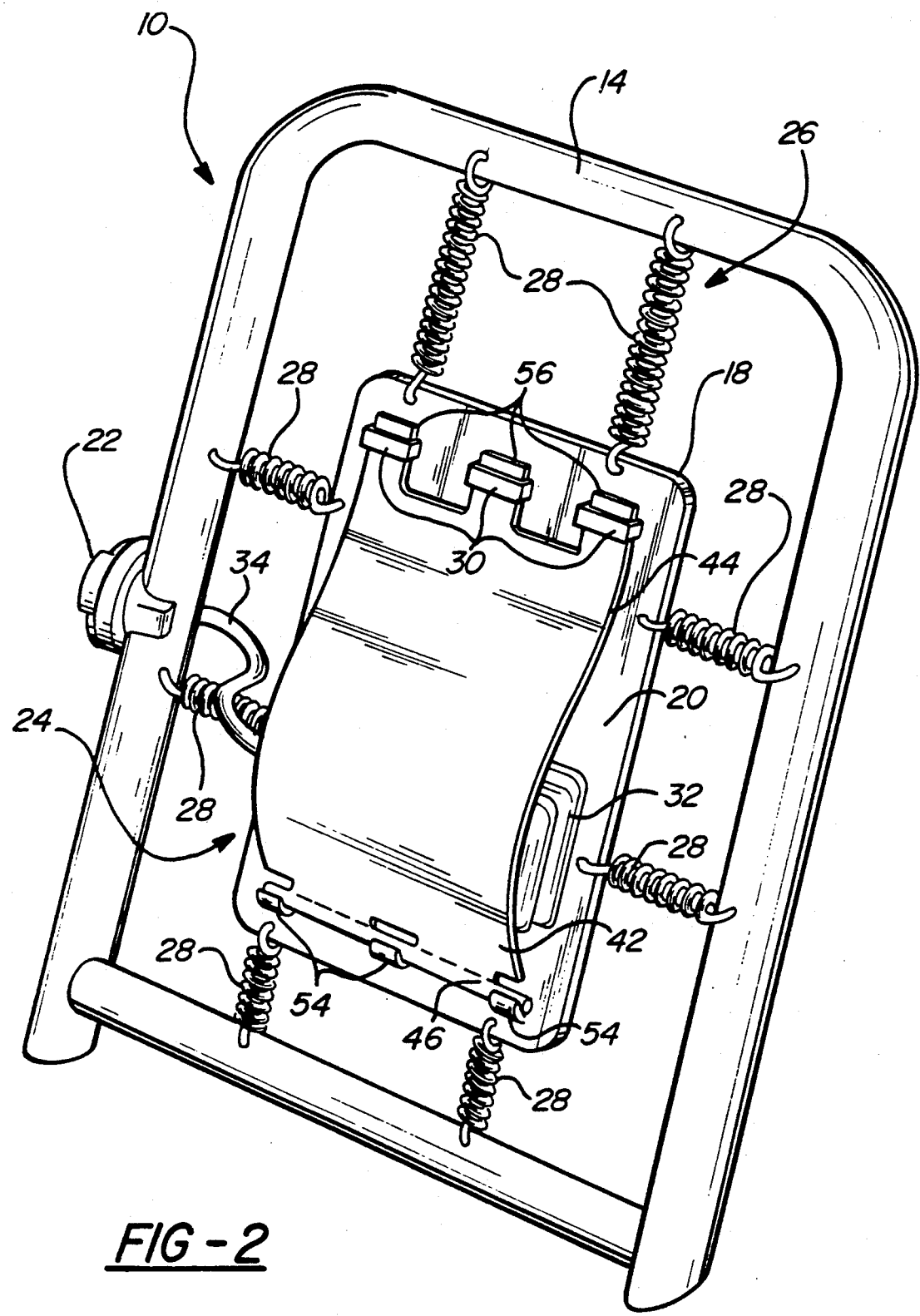
FIG. 2 is a perspective view of the assembly of the preferred embodiment of FIG. 1 without the foam seat cushion.
Figure 5:
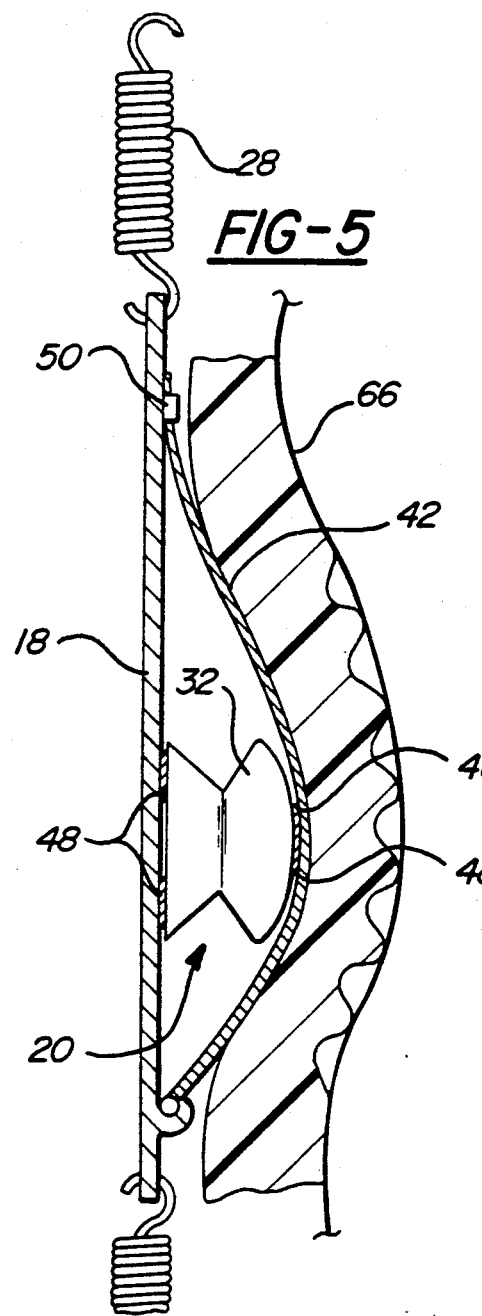
FIG. 5 is a fragmentary cross sectional view of the preferred embodiment of the subject invention.

The mounting member 18 includes suspension means 26 for supporting the mounting member 18 on the seat frame 14. The suspension means 26 includes a plurality of springs 28 as shown in FIGS. 2 and 5. The springs 28 extend outwardly from and are spaced about the periphery of the mounting member 18 for supporting the mounting member 18 on the seat frame 14. The mounting member 18 further includes a plurality of rectangular, or more particularly U-shaped, guides 30 as shown in FIG. 2.

The pneumatic adjustment means 20 comprises an accordian-like shaped impermeable bladder 32. FIGS. 3 and 4 show the bladder 32 in inflated and deflated states respectively. A tube 34 is in fluid tight communication with the bladder 32 for directing air into and out of the pneumatic adjustment means 20.

Figure 6:
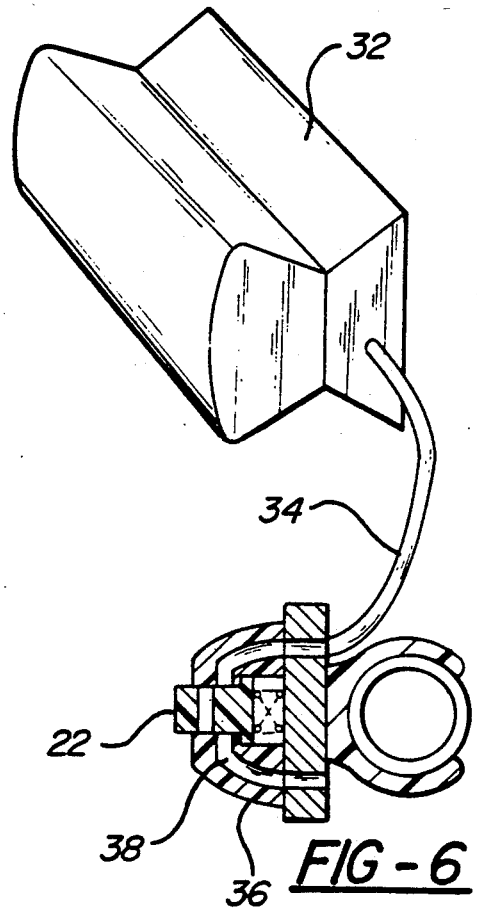
FIG. 6 is a cross section of the control means attached to the pneumatic adjustment means.

Referring to FIGS. 1, 2 and 6, the control means 22 is shown. The control means 22 includes a control valve 36, shown in FIG. 6, in fluid communication with the tube 34 for controlling the flow of air into and out of the pneumatic adjustment means 20. A biasing means 38 is provided within the control means 22 for continuously urging the control valve 36 to the closed position preventing the passage of air through the tube 34. The control means 22 also includes a clip 40 as shown in FIG. 6 allowing easy attachment of the control valve 36 to the seat 12.

The back support means 24 as in FIGS. 1 and 2, is shown to include a flexible contoured plate 42 having a free state contour to maintain the pneumatic adjustment means 20 in an inflated state thus forming the backrest 16 in the maximum outwardly contoured position. The contoured plate 42 has a bulged middle portion spaced from the mounting member 18 and extends between upper 44 and lower 46 ends having at least one of the upper 44 and lower 46 ends supported on the mounting member 18.

The bulged middle portion of the contoured plate 42 is coupled to the pneumatic adjustment means 20 by coupler means 48 preferably through the use of VELCRO, i.e., a nylon material made with both a surface of tiny hooks and a complementary surface of an adhesive pile used in matching strips that can be pressed together and pulled apart for easy fastening and infastening, but not limited thereto. The coupler means 48 also couples the pneumatic adjustment means 20 to the mounting member 18. Therefore, the pneumatic adjustment means 20, the contoured plate 42, and the mounting member 18 are fastened together as an operational unit by the coupler means 48.

A lost motion connector means 50 slideably connects one of the upper 44 and lower 46 ends of the contoured plate 42 to the mounting member 18 as shown in FIGS. 3, 4 and 5. It should be understood that either of the upper 44 or lower 46 ends of the contoured plate can be connected or supported on the mounting member 18, but in the preferred embodiment illustrated in FIGS. 1-5, the upper end 44 of the contoured plate 42 is connected to the mounting member 18 by the lost motion connector means 50. The assembly 10 further includes attachment means 52 for attaching the lower end 46 of the contoured plate 42 to the mounting member 18 to prevent vertical movement of the lower end 46 relative to the mounting member 18. More specifically, the attachment means 52 includes a plurality of semicircular hooks 54 extending from the mounting member 18. The hooks 54 rotatably support the lower end 46 of the bulged contoured plate 42 to the mounting member 18 while preventing linear movement therebetween, i.e., preventing any movement parallel to the mounting member 18. A plurality of rectangular fingers 56 on the contoured plate 42 operatively engage with the lost motion connector means 50 provided on the upper end 44 of the bulged contour plate 48. The fingers 56 on the contoured plate 42 are slideably disposed within the plurality of guides 30 connected to the mounting member 18.

In operation, the subject invention provides a simple yet durable and effective lumbar support assembly 10. Referring to FIGS. 4 and 5, the bladder 32 is shown in a fully inflated state, thus yielding the maximum outward projection from the backrest 16. It is probable that this maximum outward projection will be uncomfortable for most persons sitting in the seat 12, and therefore inward adjustment will be required. To accomplish such inward adjustment, the user first depresses the button of the control valve 36 against the biasing means 38, thereby aligning the passage in the button with the tube 34. While still depressing the button of the control valve 36, the user exerts a compressive force against the lumbar support assembly 10, such as by leaning rearwardly against the seat backrest 16. This compressive force tends to flatten the bulged central portion of the contoured plate 42 toward the mounting member 18, thereby compressing and deflating the bladder 32 disposed inbetween. Deflation of the bladder 32, in turn, forces air out of the bladder 32 and through the tube 34, which eventually passes through the passage in the button of the control valve 36 and into the ambient environment.

Once the user has achieved a comfortable adjusted position of the assembly 10, the button of the control valve 36 is released thus moving the passage in the button out of communication with the tube 34 and thereby sealing the tube 34 from communication with the ambient environment. This prevents the bladder 32 from either inflating or deflating until the control valve 36 is once again actuated. With the control valve 36 now in its normally closed state, the contoured plate 42 is locked, or frozen, in a semi-flattened position due to its coupling to the bladder 32, which, in turn, is coupled to the mounting member 18. Hence, the lumbar support assembly 10 is maintained in an adjusted state so long as the control valve 36 remains closed, as shown in FIG. 4.

If a user of the seat 12 should desire to adjust the lumbar support assembly 10 back to its maximum outward projection, the user simply depresses the button of the control valve 36, thus aligning the passage in the button with the tube 34. Because the contoured plate 42 has a natural bow, or memory, the contoured plate 42 urges, or pulls, the bladder 32 to a fully inflated condition, thus causing air to be drawn into the bladder 32 through the tube 34 and the control valve 36. If the bladder 32 were not fastened to both the mounting member 18 and the contoured plate 42, the bladder 32 would not automatically reinflate as the contoured plate 42 moved back to its natural, free state, maximum outward projection. Likewise, if the bladder 32 were not fastened to both the mounting member 18 and the contoured plate 42, then the contoured plate 42 would not remain in a semi-flattened position after inward adjustment by the user as described above.

Hence, it will become apparent that a primary advantage of the subject lumbar support assembly 10 is that the user of the seat 12 supplies the energy for adjusting the assembly 10 inwardly only. Outward adjustment of the assembly 10 is accomplished automatically by way of the contoured plate 42, with the bladder 32 serving merely to lock, or retain, the contoured plate 42 in any desired position to which the user moves it.

DESCRIPTION OF THE ALTERNATIVE EMBODIMENTS OF FIGS. 7-9

Figure 7:
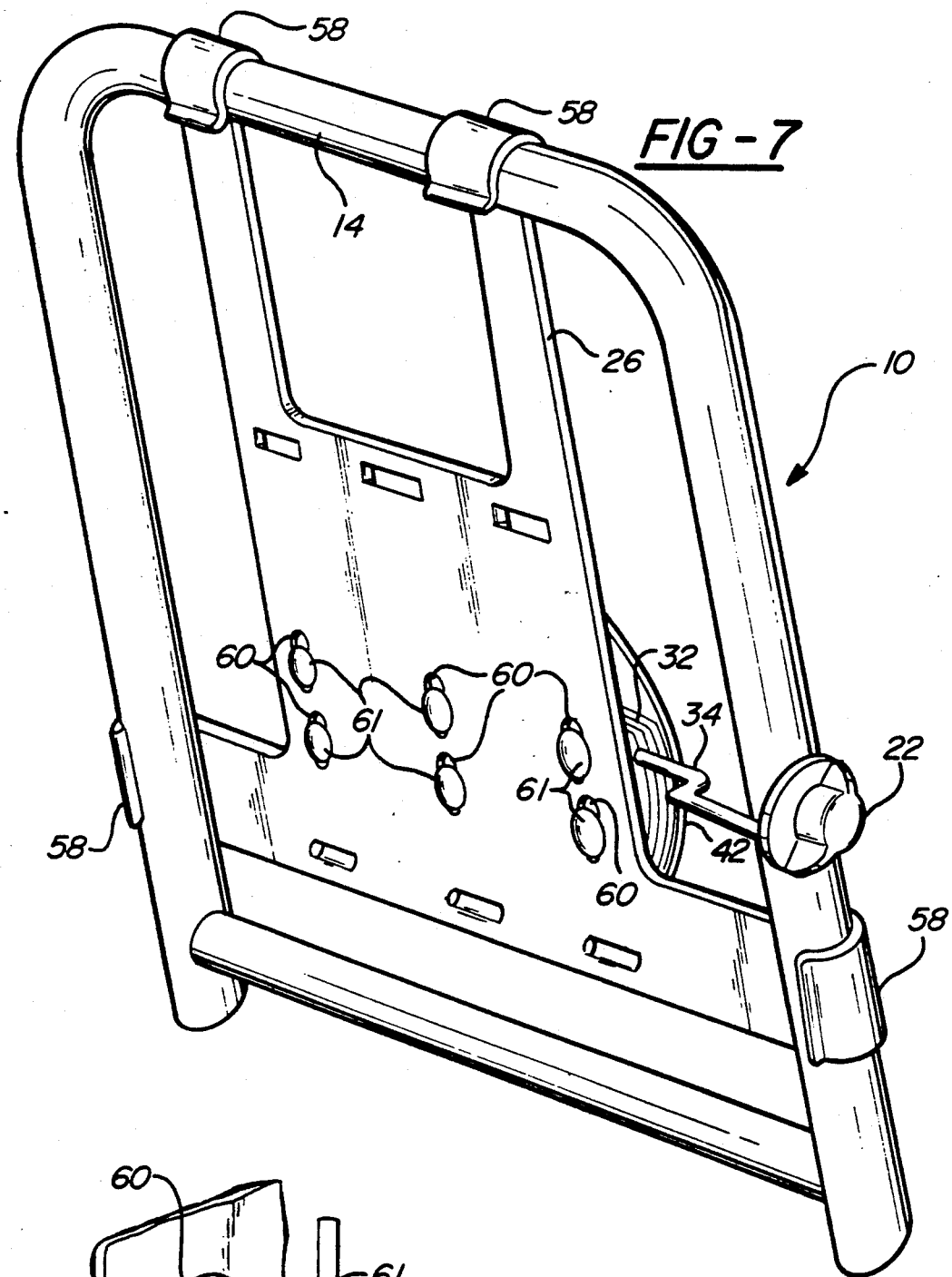
FIG. 7 is a perspective view of an alternative embodiment.
Figure 8:
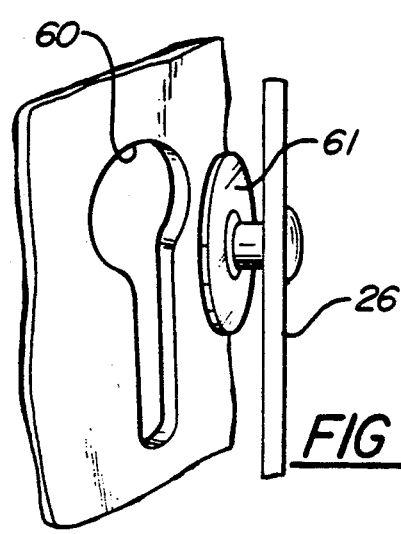
FIG. 8 is a fragmentary perspective view of a coupler means of the alternative embodiment of FIG. 7.

The embodiment of FIG. 7 shows an alternative suspension means 26 comprising a plurality of integral clips or arms 58 spaced about the periphery of the mounting member 18 for supporting the mounting member 18 on the seat frame 14.

This embodiment also includes an alternative coupler means 48 including slots 60 and fasteners 61. The slots 60 are disposed in the mounting member 18 and have enlarged ends for receiving the heads of the fasteners 61 which slideably fit within elongated slots 60 disposed in the mounting member 18. Therefore, the fasteners 61 disposed in the slots 60 are effective for slideably connecting the pneumatic adjustment means 20 to the mounting member 18 as the pneumatic adjustment means 20 moves between the inflated and deflated states.

Figure 9:
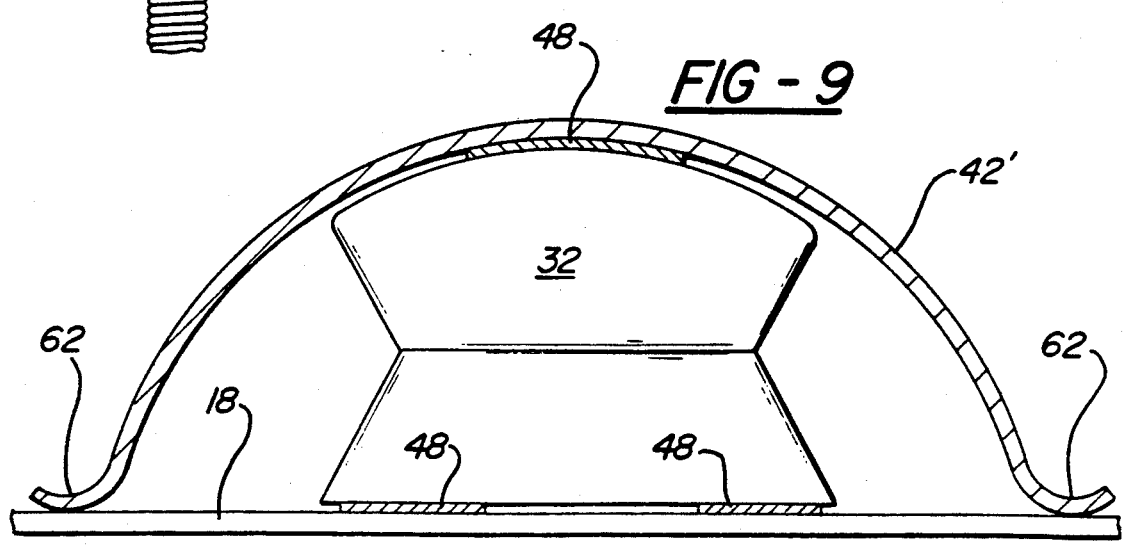
FIG. 9 is a cross section of yet another alternative embodiment.

The embodiment of FIG. 9 shows a variation for supporting the contoured plate 42' on the mounting member 18. The contoured plate 42' extends in a horizontal direction from end-to-end instead of vertically. Slider means 62 is provided for unconnected sliding movement of the contoured plate 42 relative to the mounting member 18. The slider means includes rounded ends 62 for slideably supporting the contoured plate 42' on the mounting member 18. That is, the rounded ends 62 provide unconnected sliding movement of the contoured plate 42' relative to the mounting member 18. The ends 62 of the contoured plate 42' will slide and the bow thereof moves inward as the bladder (32) moves toward deflated state, and vice versa.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A lumbar support assembly for a seat having a seat frame and a back rest with a seat cushion comprising:
a mounting member (18) for mounting to a seat frame (14),
pneumatic adjustment means (20) supported on said mounting member (18) for moving between inflated and deflated states, and
control means (22) for controlling movement of said pneumatic adjustment means (20) between said inflated and said deflated states,
characterized by including back support means (24) for biasing said pneumatic adjustment means (20) toward said inflated state and for moving inwardly toward said deflated state in response to a passenger to an infinitely adjustable contour, said back support means (24) being independently supported on said mounting member (18) and extending over said pneumatic adjustment means (20).

2. An assembly as set forth in claim 1 further characterized by said back support means (24) comprising a flexible contoured plate (42) having a free state contour maintaining said pneumatic adjustment means (20) in said inflated state while forming the backrest (16) with the seat cushion (16) in a maximum outwardly contoured position.

3. An assembly as set forth in claim 2 further characterized by said contoured plate (42) extending between upper (44) and lower (46) ends and having a bulged middle portion spaced from said mounting member (18) and at least one of said upper (44) and lower (46) ends supported on said mounting member (18).

4. An assembly as set forth in claim 3 further characterized by including coupler means (48) for coupling said bulged middle portion of said contoured plate (42) to said pneumatic adjustment means (20) and coupling said pneumatic adjustment means to said mounting member (18) to fasten together said contoured plate (42) and said pneumatic adjustment means (20) as an operational unit.

5. An assembly as set forth in claim 4 further characterized by including lost motion connector means (50) for slideably connecting one of said upper (44) and lower (46) ends of said contour plate (42) to said mounting member (18).

6. An assembly as set forth in claim 5 further characterized by said lost motion connector means (50) connecting said upper end (44) of said contoured plate (42) to said mounting member (18) and including attachment means (52) for attaching said lower end (46) of said contour plate (42) to said mounting member (18) to prevent vertical movement of said lower end (46) relative to said mounting member (18).

7. An assembly as set forth in claim 6 further characterized by said attachment means (52) including a plurality of hooks (54) extending from said mounting member (18) for rotatably supporting said lower end (46) of said contour plate (42) to said mounting member (18) while preventing linear movement between the two.

8. An assembly as set forth in claim 4 further characterized by including slider means (62) for unconnected sliding movement of the contoured plate (42) relative to the mounting member (18).

9. An assembly as set forth in claim 8 further characterized by said slider means including rounded ends (62) for slideably supporting said contour plate (42') on said mounting member (18).

10. An assembly as set forth in claim 5 further characterized by said pneumatic adjustment means (20) comprising an impermeable bladder (32) having an accordian-like shape.

11. An assembly as set forth in claim 10 further characterized by said control means (22) including a tube (34) for directing air into and out of said pneumatic adjustment means (20).

12. An assembly as set forth in claim 11 further characterized by said control means (22) including a control valve (36) in fluid communication with said tube (34) for controlling the flow of air into and out of said pneumatic adjustment means (20).

13. An assembly as set forth in claim 12 further characterized by said control means (22) including a biasing means (38) for continuously urging said control valve (36) to a closed position preventing the passage of air through said tube (34).

14. An assembly as set forth in claim 13 further characterized by said control means (22) including a clip (40) for attaching said control valve (36) to said seat (12).

15. An assembly as set forth in claim 14 further characterized by including suspension means (26) for supporting said mounting member (18) on seat frame (14).

16. An assembly as set forth in claim 15 further characterized by said suspension means (26) including a plurality of outwardly extending springs (28) spaced about the periphery of said mounting member (18) for supporting said mounting member (18) on the seat frame (14).

17. An assembly as set forth in claim 15 further characterized by said suspension means (26) including a plurality of integral clips (58) spaced about the periphery of said mounting member (18) for supporting said mounting member (18) on the seat frame (14).

18. An assembly as set forth in claim 4 further characterized by said coupler means (48) including slots (60) disposed in said mounting member (18) with enlarged ends for receiving heads of fasteners (61) extending from said pneumatic adjustment means (20) for slideably connecting said pneumatic adjustment means (20) to said mounting member (18) as said pneumatic adjustment means (20) moves between said inflated and deflated states.

19. An assembly as set forth in claim 5 further characterized by said upper end (44) including a plurality of spaced fingers (56) operatively engaged with said lost motion connector means.

20. An assembly as set forth in claim 7 further characterized by said attachment means (24) including a plurality of U-shaped guides disposed on said mounting member (18).

* * * * *